C. W. SALADEE.

CURRY-COMB.

No. 6,788. Reissued Dec. 7, 1875.

C. W. Saladee,
INVENTOR
Hotchkiss Sons,
ASSIGNEES
C. A. Hotchkiss,
PRESIDENT
Chipman Franklin & Co.,
ATTORNEYS WITNESSES
Robert Everett,
Bryan H. Morse,

N. PETERS, PHOTO-LITHOGRAPHER, WASHINGTON, D. C.

UNITED STATES PATENT OFFICE.

CYRUS W. SALADEE, OF PUTNAM, OHIO, ASSIGNOR TO HOTCHKISS SONS, OF BRIDGEPORT, CONNECTICUT.

IMPROVEMENT IN CURRY-COMBS.

Specification forming part of Letters Patent No. 45,640, dated December 27, 1864; reissue No. 1,854, dated January 24, 1865; reissue No. 6,788, dated December 7, 1875; application filed November 6, 1875.

*To all whom it may concern:*

Be it known that CYRUS W. SALADEE, of Putnam, Muskingum county, and State of Ohio, did invent a new and Improved Mode of Constructing Curry-Combs; and I do hereby declare that the following is a full and exact description thereof, reference being had to the accompanying drawings, and the letters of reference marked thereon.

Figure 1:
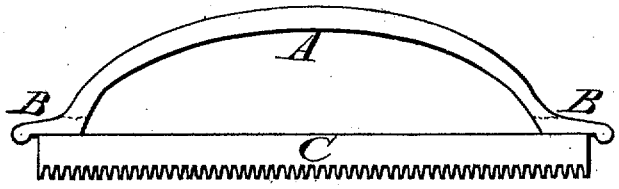
Figure 2:
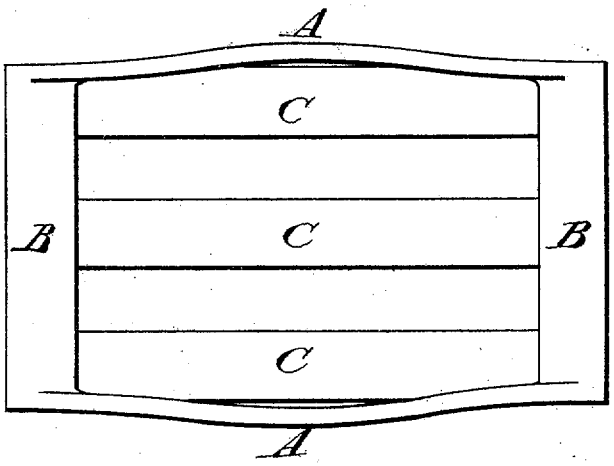
Figure 3:
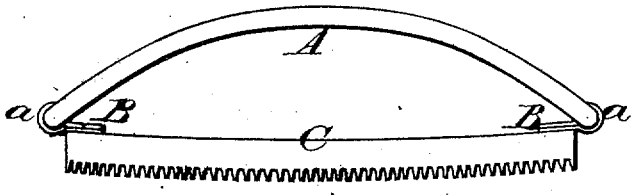
Figure 4:
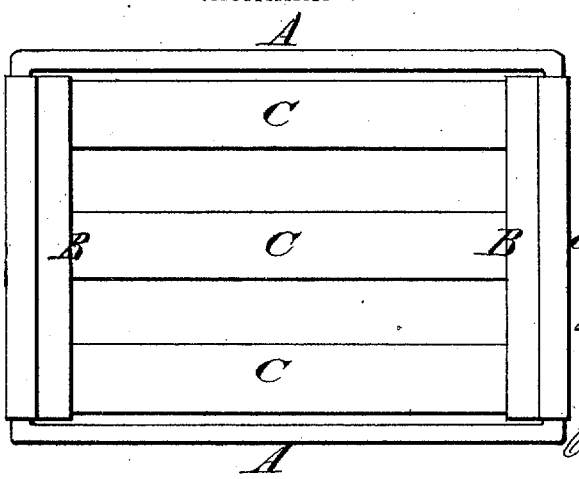

Figure 1 is a front view of the curry-comb, and Fig. 2 is a plan view thereof. Fig. 3 is a front view of a modification of Fig. 1, and Fig. 4 is a plan view of the same.

This invention has relation to curry-combs; and it consists in a curry-comb having a raised and rigid handle or holder, adapted for being grasped in the hand while using the comb, thereby affording a secure and comfortable hold, and dispensing with the old and well-known side handle, which is inconvenient and so much in the way in packing and transporting the combs.

The following description will enable others skilled in the art to understand some of the modes of carrying out the invention.

In the annexed drawings, Figs. 1 and 2, A A designate the transverse or end bars of a curry-comb, and B B are raised or arched bars or wires, which connect together the bars A A, and serve as handles for grasping the curry-comb. C C C designate trough-shaped bars, which have currying-teeth on their edges, and which are rigidly secured to the bars B B by means of rivets.

The curry-comb represented by Figs. 1 and 2 has the raised rigid handles and the bars B B cast in one piece; but, if desired, the said parts may be made separate, and the ends of the grasping-handles A A inserted into eyes *a a*, formed on bars B B, as shown in Figs. 3 and 4. The raised rigid handles or holder may be attached to the comb diagonally, or across the ends of the comb at right angles to the teeth, which latter arrangement may be found better than the longitudinal or the diagonal arrangement. The claim is not, therefore, limited to the precise arrangement of the parts shown in the annexed drawings.

The gist of the invention consists, broadly, in providing for grasping a curry-comb directly over its top or back by means of a rigid holder secured thereto by any suitable means. Such a holder serves for bracing and strengthening a curry-comb. It also avoids the unpleasantness of frequently changing the position of the comb in the hand, and it affords a better purchase or hold on the comb than can be obtained in a comb having a handle extending out on one side of it. It is obvious that if the holder were placed at the middle of the back of the comb, then a single bar, A, would answer instead of two bars, as shown.

What I claim as new, and desire to secure by Letters Patent, is—

A curry-comb having an inflexible raised bar or bars rigidly secured to its back, serving the twofold purposes of a grasping-handle and a brace for strengthening the frame-back of the comb, substantially as specified.

In testimony that I claim the above I have hereunto subscribed my name in the presence of two witnesses.

CHARLES A. HOTCHKISS,
*President Hotchkiss Sons.*

Attest:
GEORGE E. UPHAM,
WALTER C. MASI.